(No Model.)
J. & W. PATERSON.
GANG PLOW
No. 449,329. Patented Mar. 31, 1891.
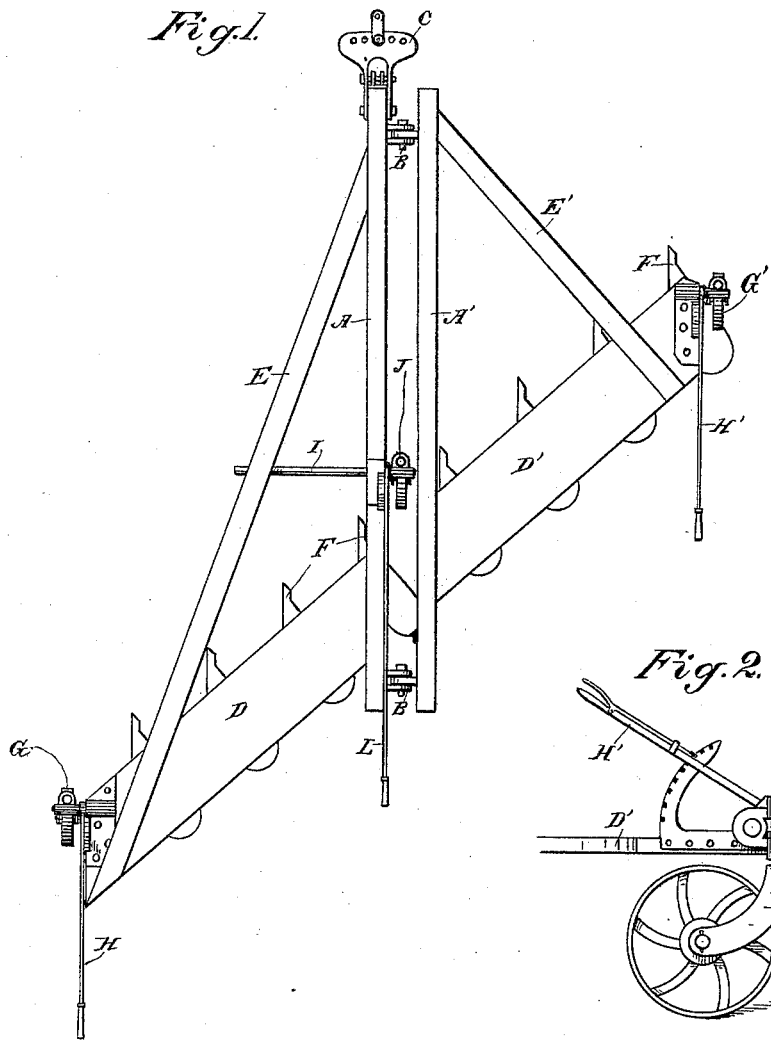
Witnesses,
Geo. H. Strong.
Inventors,
James Paterson
William Paterson
By Dewey & Co.
Attys

UNITED STATES PATENT OFFICE.

JAMES PATERSON AND WILLIAM PATERSON, OF STOCKTON, ASSIGNORS TO THE BENICIA AGRICULTURAL WORKS, OF BENICIA, CALIFORNIA.

GANG-PLOW.

SPECIFICATION forming part of Letters Patent No. 449,329, dated March 31, 1891.

Application filed April 9, 1890. Renewed February 3, 1891. Serial No. 380,079. (No model.)

*To all whom it may concern:*

Be it known that we, JAMES PATERSON and WILLIAM PATERSON, citizens of the United States, residing at Stockton, San Joaquin county, State of California, have invented an Improvement in Gang-Plows; and we hereby declare the following to be a full, clear, and exact description of the same.

Our invention relates to certain improvements in gang-plows.

It consists of a main frame, to which the power is applied for moving the plows, said frame being hinged in a central longitudinal line, so that there are two flexibly-united sides, and diagonally-arranged supporting-timbers, to which the plows are attached in line together, with bearing-wheels by which the depth of the plows upon the two sides may be independently gaged.

Referring to the accompanying drawings for a more complete explanation of our invention, Figure 1 is a plan view of our improved plow. Fig. 2 is an elevation of one of the bearing-wheels.

It consists of the parallel frame-timbers A A', having hinges, as shown at B, by which these two timbers are united together, and by which they are allowed to move about said hinges as a longitudinal axis.

C is a clevis, which is secured to the front of one of the timbers A A' and which has adjusting-holes and a connection between it and the engine or team by which the plow is moved, these adjustable connections allowing the draft to be changed as may be desirable.

Across the rear ends of the timbers A A' are fixed the independent diagonal timbers D D', one extending diagonally from one of the timbers A, to which it is strongly fixed and braced by the brace-timber E, and the other one fixed to the other timber A', braced by the brace-timber E', so that the two timbers D D' stand in line with each other and diagonally across the rear of the frame composed of the timbers A A'. To these two timbers D D' are fixed the plows F, which by reason of the inclination or angle of the timbers follow each other in the usual manner of a gang-plow.

Upon the outer ends of the timbers D D' are fixed the axles carrying the bearing-wheels G and G', and these axles are provided, respectively, with the levers H and H', by which they may be turned in their bearing-boxes upon the timbers D D' and the wheels thus moved, so as to raise or depress the ends of the timbers and with them the plows which are attached thereto.

Across the timbers A E is journaled the shaft I, having upon its inner end the bearing-wheel J, and this shaft is also provided with a lever L, by which it may be turned, so as to raise or depress the central portion of the frame and with it the plows nearest to that point.

The front end of the frame-work is, as before described, supported by the connecting clevis C and its attachment to the traction-engine or other source of power.

From this construction it will be seen that we counterbalance our plows by extending one series each side of the central timbers A A', and by hinging these timbers together and journaling upon them the wheels G, G', and J, with their respective operating-levers we are enabled to raise or depress either end or the central portion of the frame and the plows connected therewith, while by means of the jointed or flexible attachment of the two-part frame a wide plow is allowed to adjust itself to variations in the surface of the ground.

Having thus described our invention, what we claim as new, and desire to secure by Letters Patent, is—

1. A gang-plow comprising the two triangular sections having the parallel adjacent sides united together by hinges, the rear sides standing at an angle or inclination with the central timbers and in line with each other and having plows secured thereto, a fixed support or attachment for the front end of the plow-frame, and the central and exterior bearing-wheels for the rear and plow-beam, substantially as herein described.

2. A gang-plow consisting of the two triangular frames having their adjacent parallel timbers hinged together, the rear timbers forming a plow-beam fixed diagonally across the hinged timbers so as to stand in line with each other, an adjustable clevis forming a rigid connection with the engine or source of power at the front of the frame, wheels journaled upon axles at the outer ends of the plow-beams and between the hinged timbers of the frame, respectively, and levers whereby said axles may be turned so as to raise or depress either end from the center of the frame independently, substantially as herein described.

In witness whereof we have hereunto set our hands.

JAMES PATERSON.
WILLIAM PATERSON.

Witnesses:
PHILIP B. FRASER,
C. H. KEAGLE.